(12) United States Patent
Boyesen

(10) Patent No.: US 6,341,627 B1
(45) Date of Patent: Jan. 29, 2002

(54) GLASS LINED CONTAINERS

(76) Inventor: Eyvind Boyesen, R.D. 2 Box 264A, Kempton, PA (US) 19529

( * ) Notice: Subject to any disclaimer, the term of this patent is extended or adjusted under 35 U.S.C. 154(b) by 0 days.

(21) Appl. No.: 09/588,780

(22) Filed: Jun. 5, 2000

(51) Int. Cl.$^7$ .................................................. F16L 9/10
(52) U.S. Cl. ..................... 138/112; 138/114; 138/149; 138/DIG. 5; 220/62.15; 428/34.4
(58) Field of Search .................................. 138/112, 113, 138/114, 148, 149, 155, DIG. 5; 220/62.15; 428/630, 34.4, 425.6

(56) References Cited

U.S. PATENT DOCUMENTS

| | | | |
|---|---|---|---|
| 1,063,672 A | * | 6/1913 | Flannery ..................... 138/151 |
| 1,167,159 A | * | 1/1916 | Flannery ..................... 138/145 |
| 3,590,540 A | * | 7/1971 | Johnson et al. ............. 138/151 |
| 4,073,318 A | * | 2/1978 | Close et al. ................. 138/149 |
| 4,475,749 A | * | 10/1984 | Pforr et al. .................. 138/149 |
| 4,590,971 A | * | 5/1986 | Webster et al. ........ 138/DIG. 6 |
| 5,186,217 A | * | 2/1993 | Kallinich et al. ........... 138/149 |

* cited by examiner

*Primary Examiner*—James Hook

(57) ABSTRACT

A glass lined container such as a vessel or conduit for liquid or gaseous material is disclosed consisting of a strong outer shell and an inner glass liner. The glass liner is spaced uniformly from the outer shell and a molten material which will expand when solidified is poured into the space between the outer shell and glass liner and solidified to place the glass liner under high compression.

9 Claims, 3 Drawing Sheets

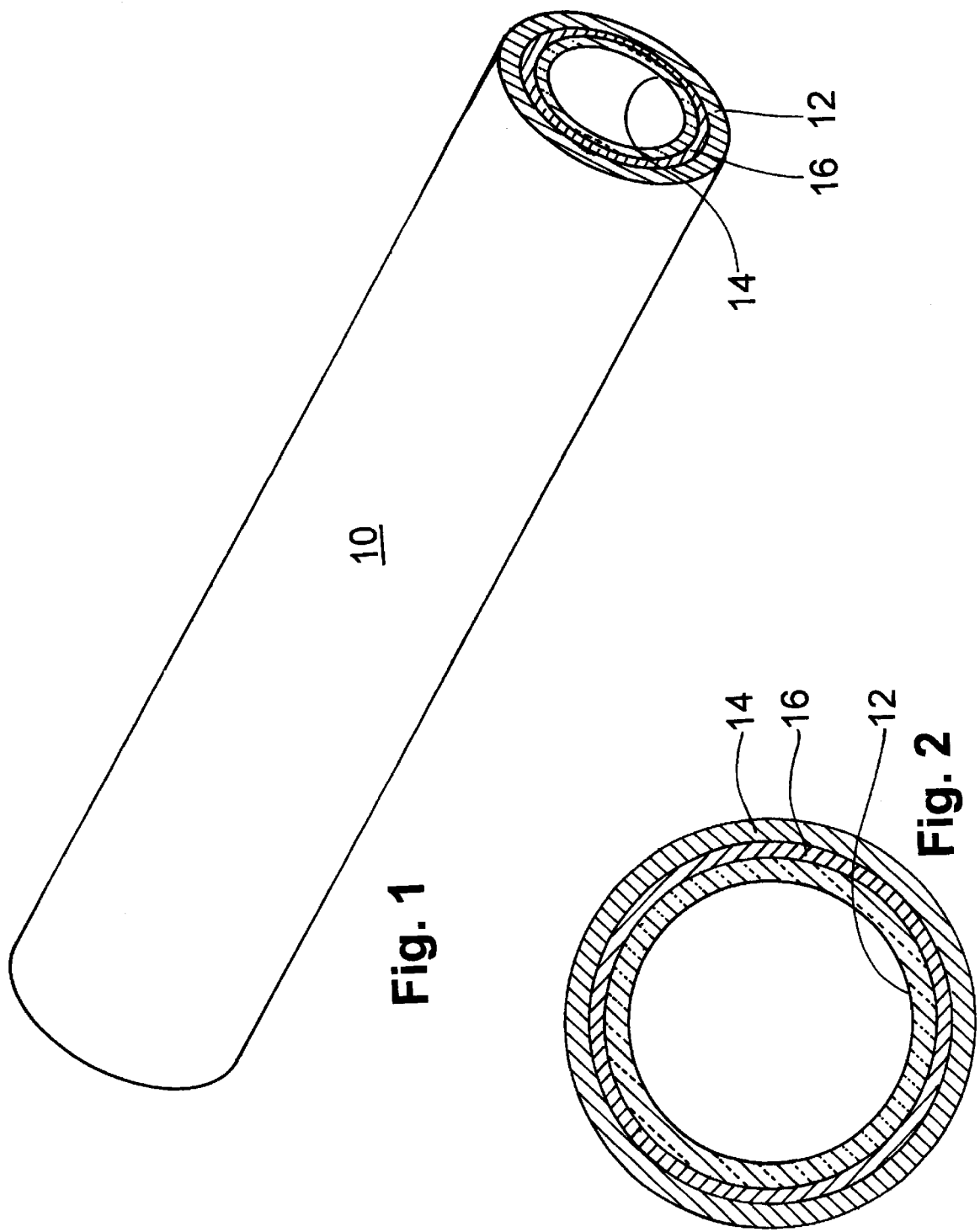

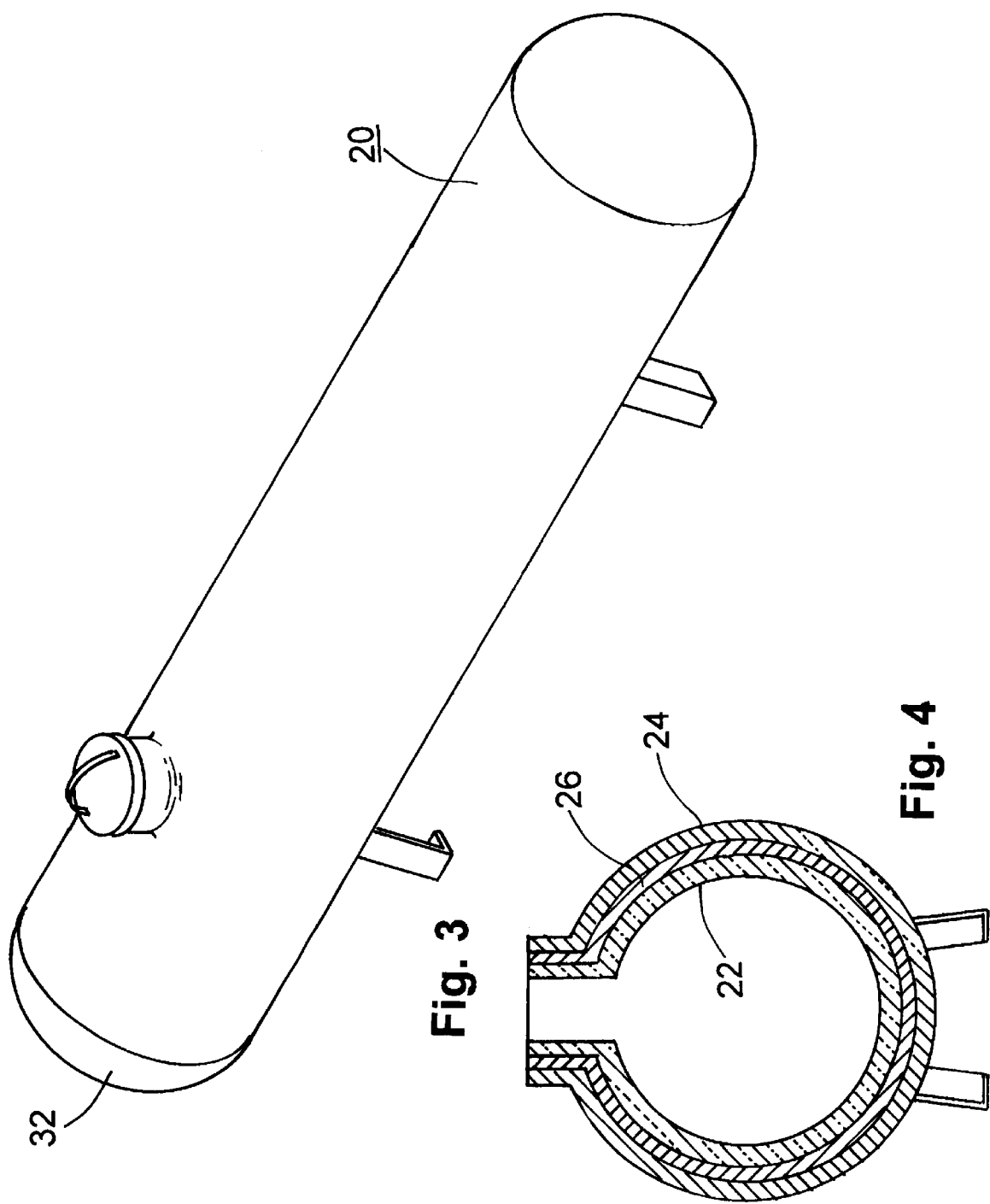

GLASS LINED CONTAINERS

FIELD OF THE INVENTION

The present invention relates to containers including both conduits and vessels lined with glass placed under compression to resist high internal pressure and tensile stresses.

BACKGROUND OF THE INVENTION

Many vessels and conduits will benefit by the use of a glass lining. For example, if a conduit is to be used in food processing equipment, glass lining is desirable in that it will not retain contaminants and can be easily cleaned. Similarly, materials which are highly contaminant or corrosive and involve environmental problems if released from the container should preferably be stored in glass containers. However, glass conduits and glass vessels are limited in pressures they can support and in stresses they can sustain. Glass is extremely brittle and bending or torsion stresses and high pressure in glass vessels or conduits will lead to an easy fracture of the product. It has been determined that if a glass liner is put into a supporting shell and subjected to compressive forces, the tensile strength of the glass is increased by a factor of three or more and the glass will resist bending, torsion, shock and pressure greater than the uncompressed glass without fracturing. To this end, a material in molten form, preferably one which will expand when it solidifies is inserted into a gap between the glass liner and the outer supporting shell to exert a compressive force on the glass liner. In addition, for lesser pressures, tension and torsion, the filler may merely serve as a supporting force for the glass liner.

It is therefore an object of the present invention to provide glass conduits and vessels in which the glass is placed under a compressive force and will sustain high internal pressures and will be resistant to corrosion from its contents.

It is a further object of the present invention to provide a container for pressurized liquids or gasses with a rigid outer shell and a glass liner, and having means intermediate the shell and liner to place the glass under compression or pre-stress the glass liner so that the liner can withstand high pressures and stresses.

Another object of the present invention is to provide a glass lined container with means intermediate an outer rigid shell and the glass liner to provide a supporting force for the glass liner.

Still a further object of the present invention to provide a glass lined vessel or conduit which can sustain high pressures and high pressure changes without fracture of the vessel or conduit.

These and other objects of the present invention will become apparent from the following description of the present invention.

SUMMARY OF THE PRESENT INVENTION

The present invention comprises a container which may be a closed vessel or conduit for liquid or gaseous material. The container is formed by providing an outer strong and rigid outer shell, preferably a strong metallic shell and a glass liner conforming to the shape of the outer shell but spaced from the inner wall of the outer shell. A molten material which will solidify at or above the normal operation temperature is poured into the spacing between the shell and liner and will expand during solidification to place the glass liner under compression permitting the liner to be used under conditions which would normally break the glass.

BRIEF DESCRIPTION OF THE DRAWINGS

FIG. 1 is a perspective view, partially in section, of a conduit made in accordance with the present invention.

FIG. 2 is a sectional view of the conduit taken on line 2—2 of FIG. 1.

FIG. 3 is a perspective view of a vessel made in accordance with the present invention.

FIG. 4 is a sectional view of the vessel taken on line 4—4 of FIG. 3.

DETAILED DESCRIPTION OF THE INVENTION

Figure 5:
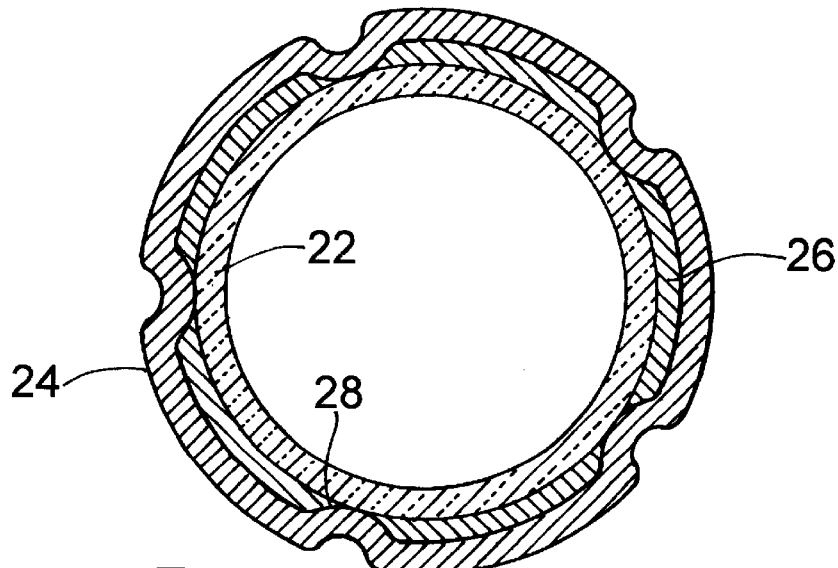
FIG. 5 is a sectional view of one means for spacing the glass liner from the outer support shell.

Referring more specifically to the drawings, and particularly FIGS. 1 and 2 thereof, there is shown a conduit 10 for transmission of liquids or gasses which comprises an inner glass liner 12 and an outer supporting shell 14 spaced uniformly from the inner glass liner a predetermined distance. Intermediate the glass liner and supporting shell is a layer of material or filler 16 which can be injected into the space between the glass liner 12 and supporting shell 14 in liquid form and which, when it solidifies, will expand and place the glass liner under a compressive stress, thereby effectively prestressing the glass liner. Similarly, if the layer of material 16 does not expand or expands with a small compressive force, it serves as a supporting force for the glass liner The spacing of the supporting shell 14 from the inner glass liner 12 depends on the molten material injected between these two members. This spacing will vary depending on the viscosity of the injected material 16, the degree of compressive stress desired in the glass liner and the size of the glass liner.

One element which has been found to be most satisfactory as the filler between the glass liner and the supporting shell is bismuth which can be injected in molten form into the space between the shell and liner to completely fill the gap. When the molten metal solidifies, it expands, thereby exerting a compressive stress on the glass liner 12. The degree of compressive stress can be varied, by the selection of the expandable material to be poured into the gap and by the size of the gap. A larger gap will translate into more expansion and therefore a higher degree of pre-exerted compression on the liner.

The outer shell 14 must have a high tensile strength and preferably is of steel or stainless steel. The thickness of this outer shell 14 will, of course depend on the degree of compression or pre-stress desired in the glass liner. In addition, the spacing between the glass liner and the outer shell will also vary depending on the degree of prestress desired and the viscosity of the molten filler. It has been found that with bismuth, the spacing between the glass liner and the support shell should be a minimum of 0.040 to 0.050 inches to permit flow of the molten bismuth between the liner and shell. With larger sizes of glass liners, this spacing can be up to or greater than one-eighth of an inch to accommodate variations in manufacturing tolerances.

Other materials which may be used to fill the gap between the glass liner and the outer support shell include heavy metals, elastomeric materials, various urethanes, preferably the more rigid urethanes and crystalline locktite.

In any event the material to be injected into the gap between the glass liner 22 and the support shell 24 must have a melting temperature less than that of the glass liner such as polyurethane foam may be utilized to pre-stress the glass liner in instances where a high degree of pre-stress is not required.

FIGS. 3, 4 and 5 illustrate one form of a vessel 20 made in accordance with the present invention for containing liquid or gaseous material under pressure. As in FIGS. 1 and 2, the vessel 20 includes a glass liner 22 and an outer support shell 24 conforming in shape to that of the glass liner and uniformly spaced from the liner. As in FIGS. 1 and 2, metallic or other material 26 in molten form is injected in the space between the glass liner and the outer shell to place the glass liner under a compressive stress.

Depending on the shape of the vessel, spacing between the side walls and bottom wall of the vessel can be provided in many conventional ways. In the case of forming a vessel 20, spacing between the bottom or end of he glass liner and the supporting shell can be provided by a projection or nipple on the glass liner 22 which will space and center the glass liner relative to the supporting shell or by small indentations on the supporting shell, as indicated at 28 in FIG. 5 to provide the proper spacing between the glass liner and the supporting shell. To complete the container or vessel 20, a cap 32 formed in the same manner as the body of the vessel 20 may be welded or otherwise secured to the open end of the vessel 20. An inlet or inlet and outlet opening 34 is provided to permit filling and emptying of the vessel.

As in the case of the conduit, the degree of pre-stress of the glass liner will depend on the type of material injected or otherwise inserted into the space between the glass liner 22 and the outer support shell 24. The same materials utilizes to pre-stress the glass liner 12 of the conduit may be used in pre-stressing the liner 22 of the vessel 20.

Figure 6:
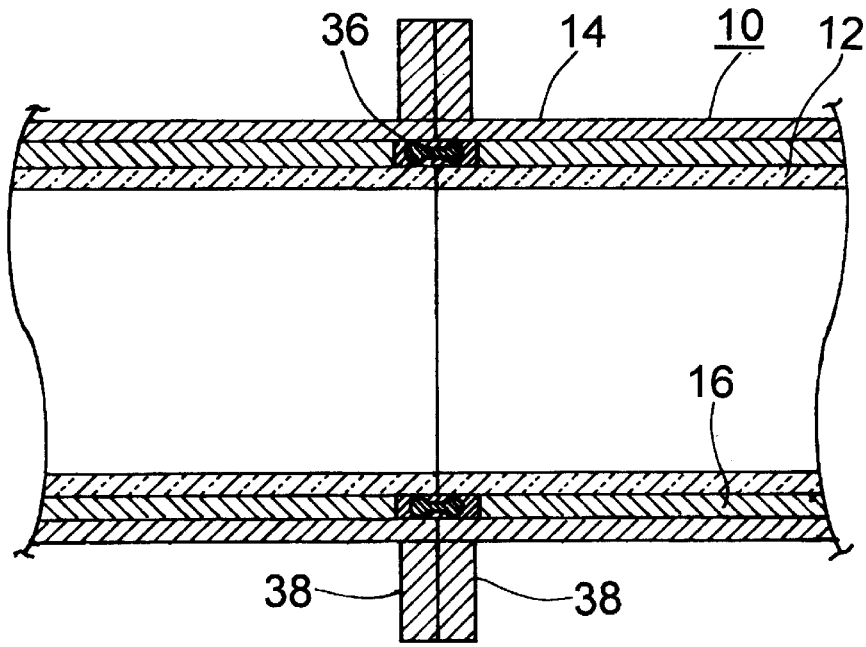
FIG. 6 is a sectional view illustrating one means for connecting lengths of conduits.
Figure 7:
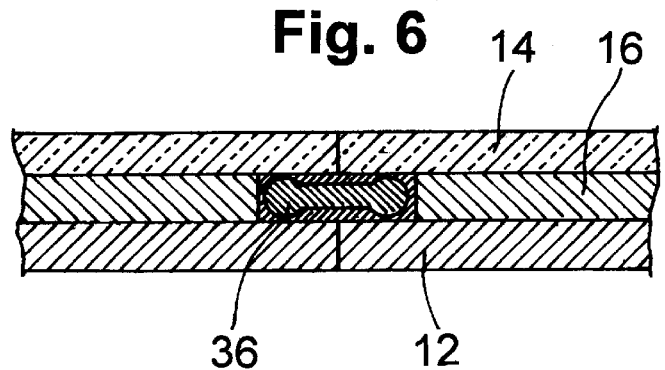
FIG. 7 is an enlarged view of the sealing means used.

FIGS. 6 and 7 illustrates one means of connecting lengths of conduit or container body and caps together. The inner glass liners of the two parts are placed in abutting relationship and a pair of connected 0-rings 36 are secured about the abutting ends of the glass liners to provide a seal. Alternatively, the glass ends may be welded by heating the glass. Flanges 38, 38 may be provided at the abutting ends of the supporting shells and bolted or otherwise secured together to connect adjacent conduit lengths. In the case of a container where the end cap and body do not require separation, the supporting shells may be welded.

While particular embodiments of the present invention have been illustrated and described herein, it is not intended to limit the invention to such disclosures, and changes and modifications may be incorporated therein within the scope of the following claims.

What is claimed is:

1. A container such as a conduit or vessel for pressurized liquids and gasses comprising a outer support shell and an inner glass liner;

said glass liner being a continuous circumferential tube of glass spaced uniformly from the interior surface of the outer support shell; and a filler intermediate the inner glass liner and the support shell to maintain said uniform spacing and exerting a compressive force on the inner glass liner to increase resistance of the inner glass liner to bending, torsion, shock and pressure stresses, said filler being inserted into the uniform spacing between the inner glass liner and the support shell in the liquid state and solidifying and expanding upon solidification.

2. A container in accordance with claim 1 wherein said filler expands upon solidification to exert the compressive force on said inner glass liner.

3. A container in accordance with claim 2 wherein said filler is a metallic material such as a heavy metal.

4. A container in accordance with claim 2 wherein said filler is bismuth.

5. A container in accordance with claim 2 wherein said multiple sections and sealing means are provided between adjacent sections, and means to secure said adjacent sections together.

6. A container in accordance with claim 2 wherein said container is a conduit for pressurized liquids and gasses.

7. A container in accordance with claim 2 wherein said container is a vessel to receive pressurized liquids and gasses.

8. A container in accordance with claim 2 wherein spacing means are provided between the glass liner and the outer shell.

9. A container in accordance with claim 8 wherein said spacing means include protrusions at spaced intervals extending between the glass liner and the outer shell.

* * * * *